United States Patent
Oliver et al.

(10) Patent No.: US 10,983,349 B2
(45) Date of Patent: Apr. 20, 2021

(54) METHOD OF DYNAMICALLY ADJUSTING DISPLAY LUMINANCE FLUX IN WEARABLE HEADS-UP DISPLAYS

(71) Applicant: GOOGLE LLC, Mountain View, CA (US)

(72) Inventors: Matthew Oliver, Bluevale (CA); Bergen Fletcher, St. Jacobs (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/412,542

(22) Filed: May 15, 2019

(65) Prior Publication Data
US 2019/0384063 A1 Dec. 19, 2019

Related U.S. Application Data

(60) Provisional application No. 62/685,181, filed on Jun. 14, 2018.

(51) Int. Cl.
*G09G 5/00* (2006.01)
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/0178* (2013.01)

(58) Field of Classification Search
CPC ............ G02B 27/0172; G02B 27/0093; G02B 2027/0178; G06F 3/013; G09G 2360/144
USPC .......................................................... 345/8
See application file for complete search history.

(56) References Cited

U.S. PATENT DOCUMENTS

| | | | | |
|---|---|---|---|---|
| 2010/0060551 A1* | 3/2010 | Sugiyama | ............... | G02B 26/06 345/8 |
| 2011/0080421 A1* | 4/2011 | Capener | .................... | G09G 5/10 345/589 |
| 2013/0066213 A1* | 3/2013 | Wellington | ............. | A61B 3/112 600/475 |
| 2014/0236260 A1* | 8/2014 | McDermott | ........ | A61N 1/36046 607/54 |
| 2015/0187330 A1* | 7/2015 | Yang | ....................... | G09G 3/001 345/690 |
| 2016/0238845 A1* | 8/2016 | Alexander | ........... | G03H 1/2645 |
| 2016/0327796 A1* | 11/2016 | Bailey | ................ | G02B 27/0172 |
| 2017/0115483 A1* | 4/2017 | Aleem | ............... | G02B 27/0093 |
| 2017/0277258 A1* | 9/2017 | Ma | ........................... | G06F 3/013 |
| 2017/0322625 A1* | 11/2017 | Mere | ........................ | G06F 3/013 |
| 2018/0052513 A1* | 2/2018 | Le Gros | ............. | G02B 27/0172 |
| 2019/0346679 A1* | 11/2019 | Miller | ....................... | G02B 3/14 |

\* cited by examiner

*Primary Examiner* — Adam J Snyder

(57) ABSTRACT

A method of operating a wearable heads-up display that in use is worn on a head of a subject user includes projecting light to an eye of the subject user and detecting an ambient light condition in an environment of the wearable heads-up display by an ambient light sensor. The method includes measuring a pupil size of the eye of the subject user and determining a target luminous flux based on an output of the ambient light sensor and the pupil size. A current luminous flux of the light projected to the eye of the subject user is adjusted based on the target luminous flux.

20 Claims, 8 Drawing Sheets

METHOD OF DYNAMICALLY ADJUSTING DISPLAY LUMINANCE FLUX IN WEARABLE HEADS-UP DISPLAYS

CROSS-REFERENCE TO RELATED APPLICATIONS

This application claims the benefit of U.S. Provisional Application No. 62/685,181, filed 14 Jun. 2018, titled "Method of Dynamically Adjusting Display Luminance in Wearable Heads-Up Displays", the content of which is incorporated herein in its entirety by reference.

TECHNICAL FIELD

The disclosure generally relates to variable luminance in display systems and particularly to variable luminance in wearable heads-up displays.

BACKGROUND

There is a new generation of wearable heads-up displays that can be worn on the head like conventional eyeglasses. These wearable heads-up displays are electronic devices that, when worn on the head of users, enable the users to see display content without preventing the users from seeing their environment. Given that these wearable heads-up displays are worn near the face and can be used as eyeglasses, comfort and aesthetics become important factors in the design of the displays. Since these devices are meant to be worn as normal eyeglasses and used throughout the day, conservation of battery power also becomes important.

A wearable heads-up display may have a range of display luminance for which content can be projected into a display space without sacrificing content quality. For maximum power conservation, the lowest luminance value in the range may be used. However, there are instances when this may not be ideal. For example, a display that is too dim may be difficult to discern in relatively bright ambient conditions, such as outdoors in sunlight. On the other hand, a display that is too bright can be uncomfortable for a user in relatively dark ambient conditions. In addition, as a "see-through display", the display cannot be so bright as to overpower the ambient surroundings, which would make it difficult for the user to discern the user's surroundings. Thus, a balance needs to be struck between conserving power, display performance, contrast between the display and ambient surroundings, and user comfort.

SUMMARY

A method of operating a wearable heads-up display that in use is worn on a head of a subject user may be summarized as including: (a) projecting light to an eye of the subject user, (b) detecting an ambient light condition in at least a portion of an environment of the wearable heads-up display by an ambient light sensor, (c) determining a pupil size of the eye of the subject user, (d) determining a target luminous flux based on an output of the ambient light sensor and the determined pupil size, and (e) adjusting a current luminous flux of the light projected to the eye of the subject user based on the determined luminous flux.

Projecting light of act (a) may include generating a visible portion of the light by at least one visible light source and scanning the visible portion of the light over at least a portion of the eye by at least one scan mirror.

Projecting light of act (a) may include generating an infrared portion of the light by at least one infrared light source and scanning the infrared portion of the light over at least a portion of the eye by at least one scan mirror. Determining of act (c) may include detecting reflections of infrared light from the at least a portion of the eye for a plurality of scan orientations of the at least one scan mirror. Determining of act (c) may further include constructing or reconstructing a digital representation of the at least a portion of the eye from the detected reflections of infrared light and corresponding scan orientations of the at least one scan mirror. Determining of act (c) may further include isolating a pupil region of the digital representation and determining the pupil size from the pupil region. Determining the pupil size from the pupil region may include at least one of determining a diameter of the pupil region and determining an area of the pupil region.

Determining of act (d) may include selecting a target display luminance from a select range of display luminance based on the output of the ambient light sensor. Determining of act (d) may further include determining the target luminous flux based on the target display luminance and the pupil size.

Adjusting of act (e) may include adjusting the current luminous flux to match the target luminous flux.

Projecting of act (a) may include generating the light by at least one light source and scanning the light over at least a portion of the eye by at least one scan mirror. Adjusting of act (e) may include measuring the current luminous flux of the light projected to the eye of the subject user. Measuring the current luminous flux of the light projected to the eye of the subject user may include directing at least a portion of the light projected to the eye of the subject user towards a photodetector. Adjusting of act (e) may further include modulating a drive current to the at least one light source based on a difference between the measured current luminous flux and the target luminous flux. Alternatively, adjusting of act (e) may include directing at least a portion of the light towards a variable optical attenuator and controlling the variable optical attenuator to attenuate the at least a portion of the light based on a difference between the measured current luminous flux and the target luminous flux.

Another method of operating a wearable heads-up display that in use is worn on a head of a subject user may be summarized as including: projecting light to an eye of the subject user, determining a pupil size of the eye of the subject user, determining a target luminous flux based on the determined pupil size, and adjusting a current luminous flux of the light projected to the eye of the subject user based on the determined target luminous flux.

A wearable heads-up display having a field of view may be summarized as including: a support frame that in use is worn on a head of a subject user; a scanning light projector carried by the support frame, the scanning light projector to project light to an eye of the subject laser, the scanning light projector including at least one light source to generate the light and at least one scan mirror to scan the light over the eye of the subject user; an ambient light sensor carried by the support frame, the ambient light sensor positioned and oriented to detect an ambient light condition in at least a portion of an environment of the wearable heads-up display; a processor carried by the support frame; and a non-transitory processor-readable storage medium communicatively coupled to the processor, wherein the non-transitory processor-readable storage medium stores data and/or processor-executable instructions, that when executed by the processor, causes the wearable heads-up display to: determine an ambient light sensor output value from an output of the ambient light sensor, determine a pupil size of the eye of the subject user, determine a target luminous flux based on the ambient light sensor output value and pupil size, and adjust a current luminous flux of the light projected to the eye of the subject user based on the target luminous flux.

The wearable heads-up display may further include an infrared detector carried by the support frame, the infrared detector positioned and oriented to detect reflections of infrared light from the eye of the subject user.

The wearable heads-up display may include a transparent combiner carried by the support frame, the transparent combiner positioned within the field of view of the wearable heads-up display, the transparent combiner including at least one of a holographic optical element and a lightguide, the transparent combiner aligned to receive the light from the at least one scan mirror and redirect the light towards the eye of the subject user when the support frame is worn on the head of the subject user.

The wearable heads-up display may further include a holographic optical element carried by the support frame, the holographic optical element positioned within the field of view of the wearable heads-up display, the holographic optical element aligned to receive the light from the at least one scan mirror and redirect the light towards the eye of the subject user when the support frame is worn on the head of the subject user. The holographic optical element may be a wavelength-multiplexed holographic optical element including a first hologram that is responsive to an infrared portion of the light and unresponsive to a visible portion of the light and a second hologram that is responsive to the visible portion of the light and unresponsive to the infrared portion of the light The scanning light projector of the wearable heads-up display may further include a variable optical attenuator to selectively attenuate the light projected to the eye of the subject user in response to a control signal to adjust the current luminous flux to match the target luminous flux.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various implementations or embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
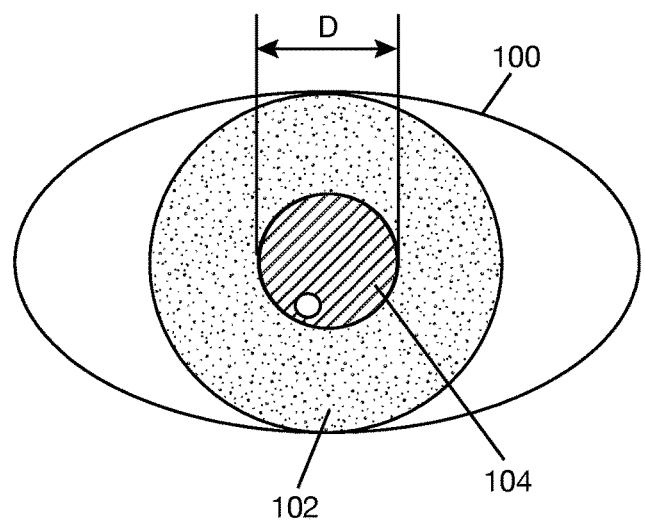
FIG. 1 is a schematic diagram of an eye.

In the following description, certain specific details are set forth in order to provide a thorough understanding of various disclosed implementations or embodiments. However, one skilled in the relevant art will recognize that implementations or embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations or embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

FIG. 1 is a schematic diagram of an eye 100 as seen from outside the eye. The eye 100 includes an iris 102 and a pupil 104. The pupil 104 is a hole at the center of the iris 102 and typically appears black when viewed from outside the eye 100. The image of the pupil 104 shown in FIG. 1 is that of the entrance pupil. The iris 102 has two muscles: the sphincter muscle, which encircles the pupil, and the dilator muscle, which runs radially in the iris 102. The sphincter muscle and dilator muscle work together to control the pupil size. In bright light, the sphincter muscle contracts and the dilator muscle relaxes, decreasing the pupil size to allow less light to enter the eye 100. In dim light, the sphincter muscle relaxes and the dilator muscle contracts, increasing the pupil size to allow more light to enter the eye 100. Pupil size is typically expressed in terms of a diameter. The normal pupil size in human adults varies from 2 mm to 4 mm in diameter in bright light and from 4 mm to 8 mm in diameter in the dark. Because the size of the pupil 104 changes in response to incident light conditions (i.e., a combination of the light incident on eye 100 from all sources), the eye 100 may serve as a biosensor to detect changes in ambient light conditions.

A scanning light projector (SLP)-based wearable heads-up display is a form of a virtual retina display in which a SLP draws a raster scan onto the eye of the user. Typically, the light sources of the SLP are laser diodes. However, other types of light sources, such as LEDs, may be used instead of laser diodes. In the absence of any further measure, the SLP projects light over a fixed area called the exit pupil of the display. In order for the user to see displayed content the exit pupil typically needs to align with, be encompassed by, or overlap with the entrance pupil of the user's eye 100. The full resolution and/or field of view ("FOV") of the display is visible to the user when the exit pupil of the display is completely contained within the entrance pupil of the eye 100. For this reason, a SLP-based wearable heads-up display often employs a relatively small exit pupil that is equal to or smaller than the expected size of the entrance pupil of the user's eye 100 (e.g., less than or equal to about 4 mm in diameter). When the exit pupil of the display converges to a point smaller than the entrance pupil of the eye 100, the pupil 104 does not aperture light from the display in the way that it does the rest of the world. Thus, for objects in the rest of the world, the pupil 104 contracts and the amount of luminous flux reaching the retina from the world is reduced, but the luminance of that object in the world remains the same. For the display, as the pupil 104 contracts, the amount of luminous flux reaching the retina from the projector is not reduced but stays the same. Thus, the luminance of the display increases as the pupil size decreases, even though the luminous flux the projector is putting into the eye 100 has not changed.

In at least one implementation, a method of adjusting luminance of a SLP-based wearable heads-up display includes sensing ambient light conditions using an ambient light sensor that is positioned and oriented to sense ambient light conditions in at least a portion of an environment of the wearable heads-up display and sensing ambient light conditions using a pupil 104 of at least one eye 100 of a user wearing the wearable heads-up display. Each of the ambient light sensor and the pupil 104 gives an ambient light value that forms a basis for adjusting luminance of the wearable heads-up display. The net effect of adjusting luminance of the wearable heads-up display based on ambient light values from the ambient light sensor and the pupil may be optimization of a contrast between the display and the world. In at least one implementation, the wearable heads-up display is operable to measure a size of the pupil 104. The measurement of pupil size may be implemented by scanning the eye 100 with infrared light and detecting reflections of infrared light from the eye 100, where the pupil size may be extracted from the detected reflections and corresponding scan orientations, or may be implemented by a camera that captures an image of the eye, where the pupil size may be extracted from the image.

In one example, the target luminance of a SLP-based wearable heads-up display may be related to an ambient light sensor output value by the following expression:

$$L_{target} = (L_{max} - L_{min}) * K_w + L_{min} \quad (1)$$

where $L_{target}$ is target luminance of the display, $L_{max}$ is maximum luminance of the display, $L_{min}$ is minimum luminance of the display, and $K_w$ is ambient light sensor output value.

$K_w$ in Equation (1) is obtained from an output of the ambient light sensor that is positioned and oriented to sense ambient light conditions in at least a portion of an environment of the wearable heads-up display. In one implementation, $K_w$ ranges from 0 to 1, where 0 corresponds to a very dim ambient light condition (e.g., in a dark room), and 1 corresponds to a very bright ambient light condition (e.g., outside in sunlight). The terms "very dim" and "very bright" are relative, and they can be defined for the display based on desired user experience and/or display performance. The ambient light sensor measures the amount of light incident on its sensor surface per unit area. The output value of the ambient light sensor is typically expressed as lux. However, the output value of the ambient light sensor may be normalized to obtain $K_w$ that ranges from 0 to 1.

$L_{min}$ and $L_{max}$ in Equation (1) are endpoints of a range of luminance for which the display may project content into the display space without sacrificing content quality. For example, $L_{min}$ may be in a range from 50 to 350 cd/m$^2$, and $L_{max}$ may be in a range from 900 to 1200 cd/m$^2$. However, these example ranges are not intended to be limiting and may be selected based on desired display performance.

Equation (1) shows a linear relationship between target luminance, $L_{target}$, and ambient light sensor output value, $K_w$. However, other types of linear relationships besides the particular one shown in Equation (1) may be used. In addition, the relationship between target luminance and ambient light sensor output value may be nonlinear in other examples. Further, the relationship between target luminance and ambient light sensor output value may be expressed as a step function instead of as a linear function. For example, the ambient light sensor output values may be divided into groups of ambient light sensor output values (e.g., 0 to 0.25, 0.26 to 0.50, 0.51 to 0.75, and 0.76 to 1.0), and a target luminance between $L_{min}$ and $L_{max}$ may be set for each group.

In one example, the target luminous flux that the projector of the SLP-based wearable heads-up display is expected to produce and put into the eye may be related to pupil size and target luminance by the following expression:

$$\Phi_{target} = L_{target} \cdot \tan^2(\theta/2) \cdot K_p \quad (2)$$

where $$K_p = 4 \cdot A_p \quad (3)$$

where $\Phi$ is luminous flux produced by the projector, $L_{target}$ is target luminance of the display, which may be given by Equation (1), $\theta$ is divergence angle of luminous flux (or FOV size), $K_p$ is ambient light level due to pupil size, and $A_p$ is area of the pupil. If, for example, the pupil is approximated by a circle, then $K_p$ will be:

$$K_p \eta D^2 \quad (4)$$

where D is diameter of the pupil of the eye.

From Equations (1) and (2), luminous flux produced by the projector, $\Phi_{target}$, is a function of both ambient light sensor output value, $K_w$, and ambient light level due to pupil size, $K_p$. For illustrative purposes, assume $L_{max}$=1,000 cd/m² and $L_{min}$=300 cd/m². If $K_w$=0.8 ("bright world"), then $L_{target}$=860 cd/m² according to Equation (1). If D=4 mm and θ=10°, then $\Phi_{target}$=0.00033 lumens and $K_p$=50 mm² (or 0.000050 m²) according to Equations (2), (3), and (4). By this method, $\Phi_{target}$ can be obtained for any ambient light sensor output value and pupil size, i.e., pupil diameter or pupil area, and the luminance of the display can be adjusted by controlling the luminous flux produced by the projector to $\Phi_{target}$. The relationship between target luminance and pupil size expressed by Equations (2) and (3) is nonlinear. However, other types of nonlinear relationships besides the particular one shown in Equations (2) and (3) may be determined, for example, by calibration.

Figure 2:
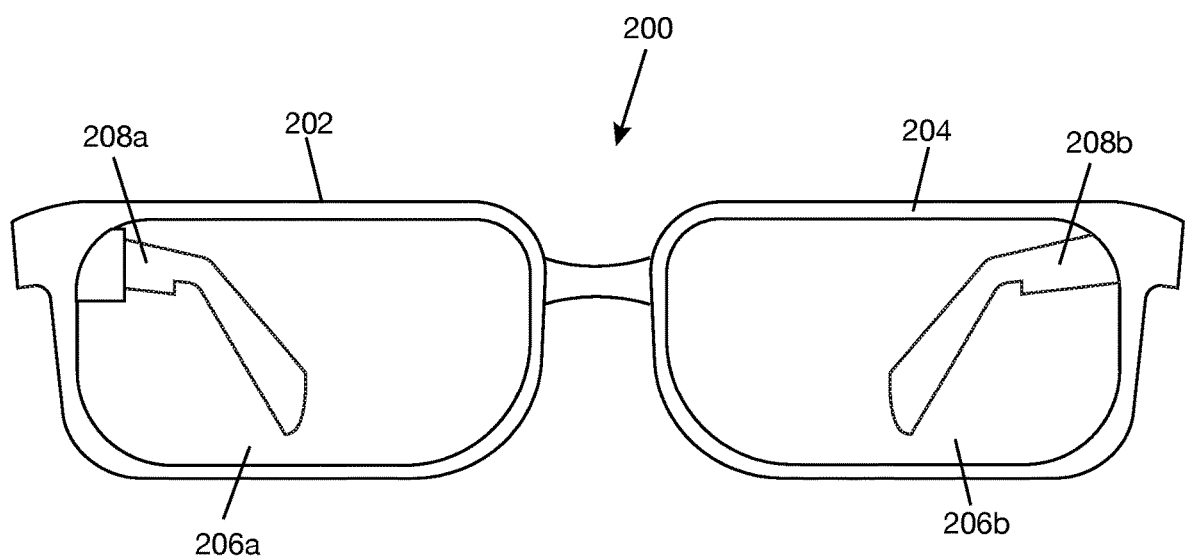
FIG. 2 is a frontal elevational view of a wearable heads-up display.

FIG. 2 illustrates a wearable heads-up display 200 having an appearance of eyeglasses (or glasses) according to one example. In other examples, wearable heads-up display 200 may take on other near-eye display forms, such as goggles. In at least one implementation, wearable heads-up display 200 is a SLP-based wearable heads-up display. In one example, wearable heads-up display 200 includes a support frame 202 that carries the devices, electronics, and software that enable wearable heads-up display 200 to display content to a user. In one example, support frame 202 includes a frame front 204 carrying a pair of transparent lenses 206a, 206b and temples 208a, 208b attached to opposite sides of frame front 204. Many of the components of wearable heads-up display 200 are carried by or within temples 208a, 208b. Frame front 204 may also carry some components of wearable heads-up display 200. For example, frame front 204 may include structures, such as conductors, to enable communication between the components carried by or within temples 208a, 208b.

Figure 3A:
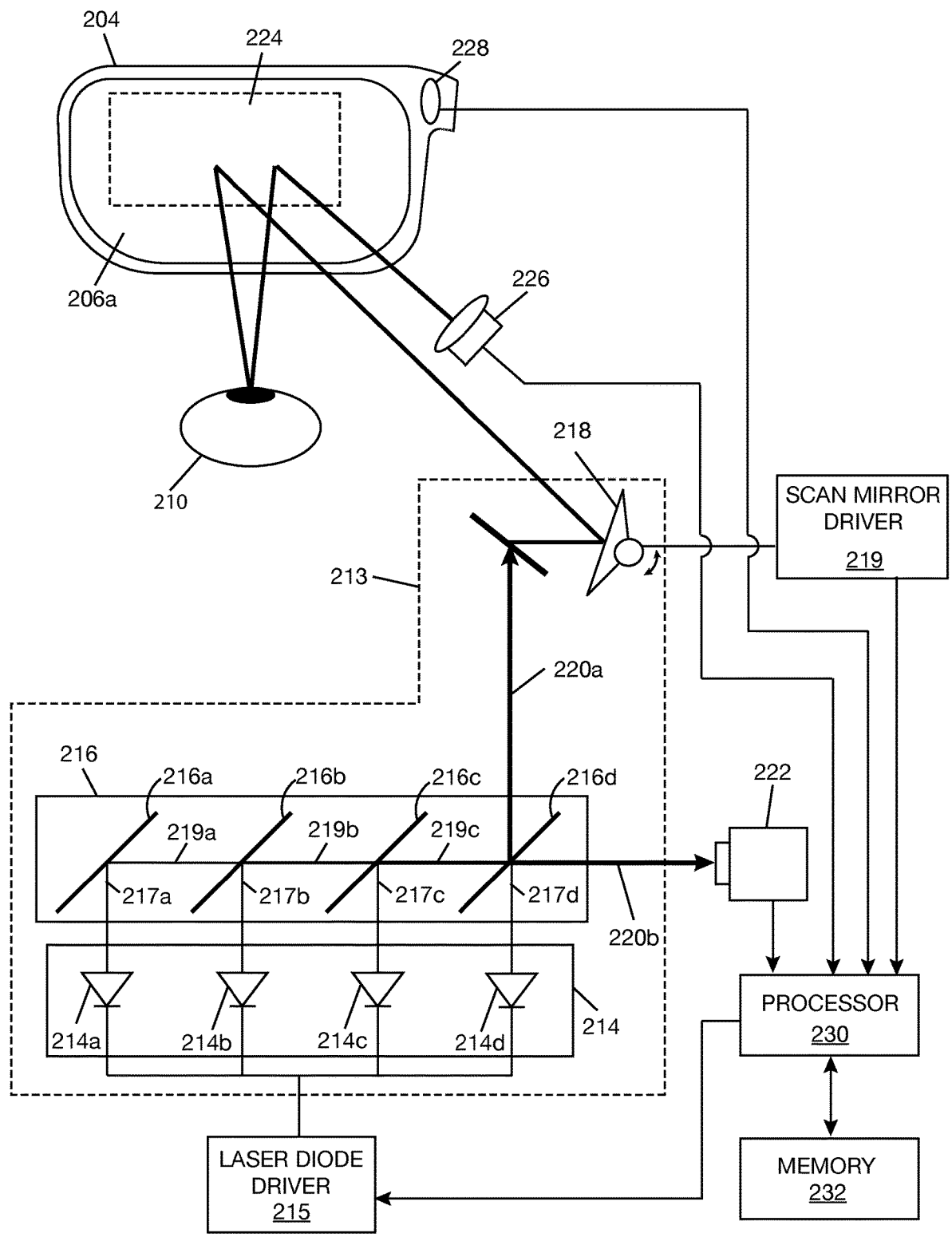
FIG. 3A is a schematic diagram/block diagram of a wearable heads-up display according to one implementation.

FIG. 3A is a schematic diagram of a portion of wearable heads-up display 200 positioned relative to an eye 210 of a user according to one illustrative implementation. In the interest of clarity and because the wearable heads-up display may be configured in multiple ways, not all the components of the wearable heads-up display are shown in FIG. 3A. In general, the components shown in FIG. 3A are the components relevant to displaying content in a display space and adjusting display luminance in response to ambient light conditions. Further, all the components shown in FIG. 3A may be carried by the support frame 202 (in FIG. 2). In the illustrative implementation shown in FIG. 3A, wearable heads-up display 200 includes a SLP 213 to project light into eye 210. In one example, SLP 213 includes a laser module 214 (or, more generally, light module) to generate visible and infrared light, a beam combiner 216 to aggregate the visible and infrared light into a single combined beam, and an optical scanner 218 to scan the single combined beam over eye 210.

In one example, laser module 214 includes any number and combination of laser diodes to generate infrared light and visible light. In alternate examples, laser module 214 may be replaced with a light module using any number of combination of light sources besides laser diodes, such as LED, OLED, super luminescent LED (SLED), microLED, and the like. In general, wherever laser diodes are used, these may be replaced with alternative light sources. In the illustrated example, laser module 214 includes a plurality of visible laser diodes 214a, 214b, 214c, each to generate visible light in a narrow waveband, and an infrared laser diode 214d to generate infrared light. As a further example, visible laser diodes 214a, 214b, 214c may be red laser diode to generate red light, green laser diode to generate green light, and blue laser diode to generate blue light, respectively. Laser diode driver 215 provides driving current to each of the laser diodes 214a, 214b, 214c, 214d according to "display data." However, only the display data represented by visible light will be visible to eye 210. In addition to modulating the laser diodes according to display data, laser diode driver 215 may also adjust the current level to achieve a desired luminous flux that is projected into eye 210. In one implementation laser diode driver 215 receives a target luminous flux from a processor 230, which executes logic to compute the target luminous flux based on ambient light conditions and pupil size. The laser diodes and laser diode driver mentioned above may be replaced with alternate light sources and corresponding light source driver, respectively.

Beam combiner 216 includes optical elements 216a, 216b, 216c, 216d to receive the beams from laser diodes 214a, 214b, 214c, 214d, respectively, and combine the beams into a single combined beam. In the illustrated example, optical element 216a is positioned and oriented to receive an output beam 217a of laser diode 214a and reflect at least a portion of the output beam 217a towards optical element 216b, as shown at 219a. Optical element 216b is positioned and oriented and has characteristics to receive the beam 219a from optical element 216a and an output beam 217b from laser diode 214b, combine the beams into a first combined beam, and direct the first combined beam to optical element 216c, as shown at 219b. In one example, optical element 216b is made of a dichroic material that is transparent to at least the red wavelength generated by laser diode 214a and the green wavelength generated by laser diode 214b. Optical element 216c is positioned and oriented and has characteristics to receive the first combined beam 219b from optical element 216b and an output beam 217c from laser diode 214c, combine the beams into a second combined beam, and direct the second combined beam to optical element 216d, as shown at 219c. In one example, optical element 216 is made of a dichroic material that is transparent to at least the red wavelength generated by laser diode 214a, at least the green wavelength generated by laser diode 214b, and at least the blue wavelength generated by laser diode 214c. Optical element 216d is positioned and oriented and has characteristics to receive the second combined beam 219c from optical element 216c and an output beam 217d from laser diode 214d, combine the beams into a single combined beam, and split the single combined beam into a first beam portion 220a, which is directed to optical scanner 218, and a second beam portion 220b, which is directed to a photodetector 222.

Photodetector 222 measures an intensity of second beam portion 220b, which is representative of the luminous flux into eye 210 or from which luminous flux into eye 210 can be determined. In one implementation, the output of photodetector 222 has been calibrated such that the ratio of light incident on the photodetector 222 versus the light projected into eye 210 is known. With this ratio, the output value of photodetector 222 is representative (or proportional) to the luminous flux into eye 210. Processor 230 is communicatively coupled to photodetector 222 to receive the output of photodetector 222.

Optical scanner 218 is positioned, oriented, and operable to receive single combined beam 220a from beam combiner 216 and scan beam 220a across at least a portion of eye 210. In one implementation, optical scanner 218 includes at least one scan mirror. In one example, optical scanner 218 may be a two-dimensional scan mirror operable to scan in two directions, for example, by oscillating or rotating with respect to two axes. In another example, scan mirror 218 may include two orthogonally-oriented mono-axis mirrors, each of which oscillates or rotates about its respective axis. The mirror(s) of optical scanner 218 may be microelectromechanical systems (MEMS) mirrors, piezoelectric mirrors, and the like. In operation, optical scanner or scan mirror(s) 218 scans beam 220a over eye 210 by sweeping through a range of scan orientations. For each scan orientation, scan mirror(s) 218 receives beam 220a from beam combiner 216 and reflects beam 220a into a respective region of eye 210. Scan mirror driver 219 is operable to apply driving voltages to the scan mirror(s) of the optical scanner 118 so that the beam 220a lands on the correct spot in the display space. In other implementations, optical scanner 218 may be a mirrorless optical scanner, such as a fiber optic scanner, or a combination of mirror and mirrorless optical scanning elements.

In one implementation, optical scanner 218 scans beam 220a over at least a portion of eye 210 by directing beam 220a to a transparent combiner 224 in a field of view of the wearable heads-up display. Lens 206a may be a combiner lens including transparent combiner 224. Transparent combiner 224 redirects at least a portion of beam 220a that it receives from optical scanner 218 to eye 210.

Figure 3B:
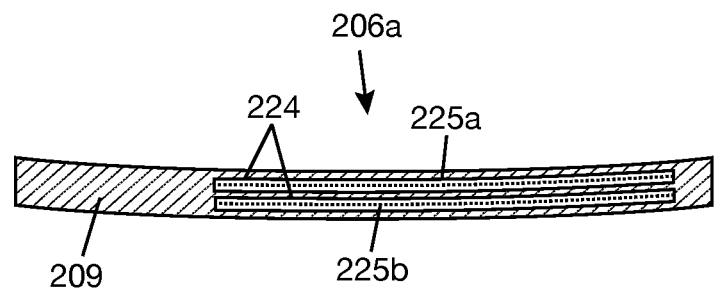
FIG. 3B is a cross-sectional view of a combiner lens including infrared and visible holograms.

In one example, transparent combiner 224 may be a free-space combiner implemented with a wavelength-multiplexed holographic optical element that selectively responds to different wavelengths of light. In general, a holographic optical element is an optical element that is produced using holographic principles and processes. In one implementation, as illustrated in FIG. 3B, transparent combiner 224 may include at least one visible hologram 225a that is responsive to infrared light and unresponsive to visible light and at least one infrared hologram 225b that is responsive to visible light and unresponsive to infrared light. "Responsive," herein, means that the hologram redirects at least a portion of the light, where the magnitude of the portion depends on the playback efficiency of the hologram. "Unresponsive," herein, means that the hologram transmits the light, generally without modifying the light. The holograms are encoded, carried, embedded in or on, or otherwise generally included in a single volume of holographic material, e.g., photopolymer and/or a silver halide compound. Holograms 225a, 225b may be embedded in or otherwise attached to lens 209. Holograms 225a, 225b and lens 209 will provide combiner lens 226a (in FIG. 3A).

Figure 3C:
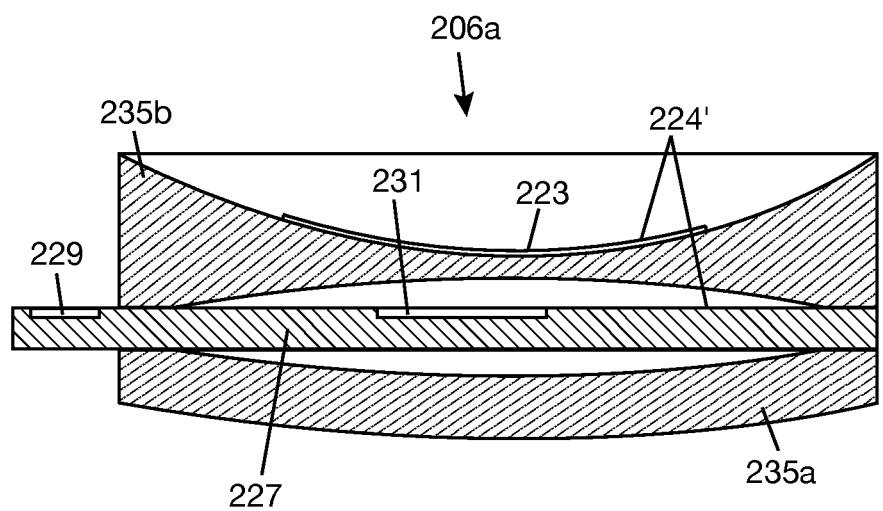
FIG. 3C is a cross-sectional view of a combiner lens including a lightguide and an infrared hologram or hot mirror.

In another implementation, as illustrated in FIG. 3C, transparent combiner 224' may be a substrate-guided combiner including a waveguide or lightguide 227, hereafter referred to as lightguide 227, carrying an in-coupler 229 and out-coupler 231 for coupling light into and out of the lightguide. Lightguide 227 transfers collimated light by total internal reflection. In addition, transparent combiner 224' may include an infrared hologram or hot mirror 233 that is responsive to infrared light and unresponsive to visible light. The infrared hologram or hot mirror 233 may be used to direct infrared light to the eye while lightguide 227 may be used to transfer visible light to the eye. Alternatively, lightguide 227 and couplers 229, 231 may transfer both visible light and infrared light to the eye, i.e., transparent combiner 224' may not include infrared hologram or hot mirror. In the example shown in FIG. 3C, lightguide 227 with couplers 229, 231 are positioned between lenses 235a, 235b. The entire assembly may be used as lens 206a in FIG. 3A.

Returning to FIG. 3A, to allow a pupil size of an eye to be determined, wearable heads-up display 200 may include an image sensor, such as a CMOS sensor, to capture an image of eye 210. Alternatively, wearable heads-up display 200 may include an infrared detector 226 positioned and oriented to detect reflections of infrared light from eye 210, where an image or digital representation of at least a scanned portion of eye 210 may be extracted from the detected reflections (from infrared detector 226) and scan orientations (of optical scanner 218) corresponding to the detected reflections. In general, an infrared detector is a device that is sensitive to and responsive to infrared light and that provides signals responsive to sensing or detecting infrared light. In one example, infrared detector 226 is a single photodiode sensor or photodetector that is responsive to infrared light. In another example, infrared detector 226 may be a plurality of photodetectors that are responsive to infrared light. Wearable heads-up display 200 may include one or a plurality of infrared detectors 226. Infrared detector 226 is positioned to detect reflections of infrared light from eye 210, e.g., by detecting reflections of infrared light directly from eye 210 and/or directly from transparent combiner 224, which is positioned to receive reflections of infrared light from eye 210.

In one implementation, processor 230 (e.g., hardware processor or circuitry) receives samples of an output of infrared detector 226 ("detected reflection data") and sync mirror signals of scan mirror driver 219 ("scan orientation data") and uses the detected reflection data and scan orientation data to reconstruct an image or digital representation of a scanned portion of the eye 210 that includes the pupil 104 (FIG. 1). The term "reconstruct" is used in the sense of to "form an impression or model of a thing from the available evidence." With respect to reconstructing at least a portion of an image or representation of the eye 210, each detected reflection comes from a point in a scan area including the eye 210. It is possible to imagine the scan area as being made of an array of pixels. For each scan orientation, the infrared light from the optical scanner 118 strikes one of the pixels in the scan area and is reflected from the pixel. By determining the scan orientation corresponding to each detected reflection, pixel location of the detected reflection in the scan area can be determined, and the image or digital representation of the eye can be reconstructed from the detected reflections. The processor 230 may isolate a pupil region of the image or digital representation and determine a size of the pupil, e.g., a diameter or area of the pupil, from the isolated pupil region.

In another implementation, wearable heads-up display 200 may include an edge detection circuit that detects an edge of a pupil from the output signal of infrared detector 226 and sync mirror signals of scan mirror driver 219. Such an edge detection circuit is described in, for example, U.S. Provisional Application No. 62/680,273 ("Edge detection circuit and detection of features on illuminated eye using the same"), the content of which is incorporated herein by reference. In one example, instead of processor 230 reconstructing an image of a scanned portion of eye 210 from the detected reflection data and scan orientation data, processor 230 may receive the pupil edge information from the edge detection device and compute the pupil size from the pupil edge information. Processor 230 may receive the pupil edge information in the form of points on the edge of the pupil. Processor 230 may fit a shape, e.g., a circular or near-circular shape (e.g., an ellipse), to the points, and then determine the diameter and/or area of the shape. In another example, the edge detection circuit may compute the pupil size, e.g., diameter and/or area, and provide the pupil size to processor 230.

Wearable heads-up display 200 includes an ambient light sensor 228 that is positioned and oriented to detect ambient light conditions in at least a portion of an environment of wearable heads-up display 200. Ambient light sensor 228 may be mounted on the frame front 204 or, in the interest of aesthetics, inside one of the temples (208a, 208b in FIG. 2). Where ambient light sensor 228 is mounted inside one of the temples, a light pipe may be formed that runs from a surface of the frame front 204 to ambient light sensor 228 so that light from the environment of wearable heads-up display 200, e.g., light in front of the frame front 204, may reach ambient light sensor 228. In one implementation, processor 230 is communicatively coupled to ambient light sensor 228 to receive an output of ambient light sensor 228. Processor 230 may compute ambient light sensor output value, $K_w$, from the output of ambient light sensor 228.

In FIG. 3A, processor 230 is shown as communicatively coupled to photodetector 222, laser diode driver 215, scan mirror driver 219, infrared detector 226, and ambient light sensor 228. Through this communication, processor 230 may receive output of ambient light sensor 228 and compute ambient light sensor output value $K_w$. Processor 230 may receive detected reflections from infrared detector 226 and scan orientation data from scan mirror driver 219 and compute pupil size. Processor 230 may receive an output of photodetector 222 and determine a current luminous flux being projected into eye 210. Processor 230 may compute a target luminous flux and provide a control signal to laser diode driver to adjust the current luminous flux to match the target luminous flux. Processor 230 may be a general-purpose computer that performs computational operations. For example, processor 230 may be a central processing unit (CPU), a microprocessor, a controller, an application specific integrated circuit (ASIC), system on chip (SOC) or a field-programmable gate array (FPGA). In FIG. 3A, processor 230 is also shown as communicatively coupled to memory 232. Memory 232 includes at least one non-transitory computer-readable storage medium that stores data and processor-executable instructions. Memory 232 may include one or more of random-access memory (RAM), read-only memory (ROM), Flash memory, solid state drive, and other computer-readable storage medium.

Figure 4:
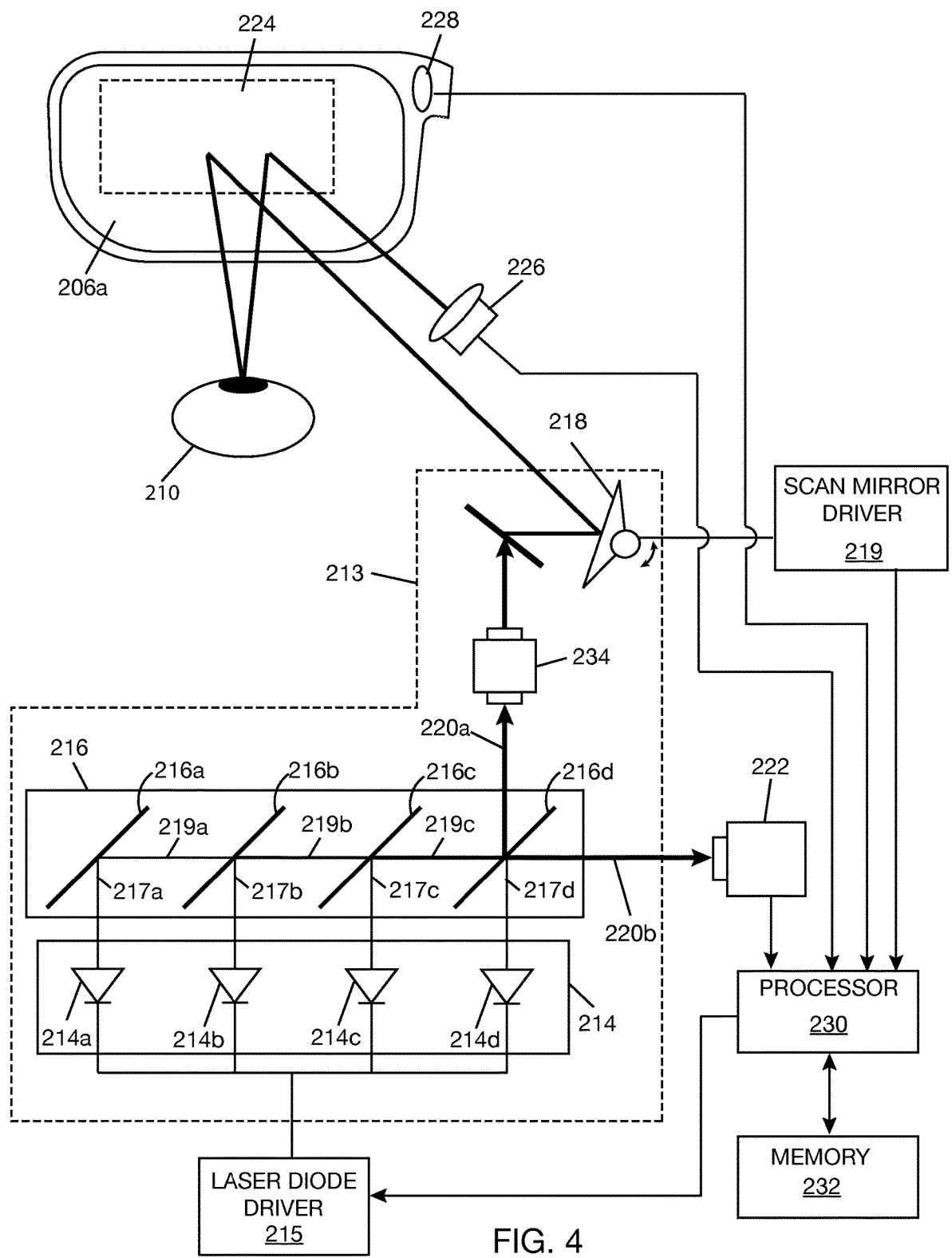
FIG. 4 is a schematic diagram/block diagram of a wearable heads-up display according to another implementation.

FIG. 4 shows an alternative implementation of the wearable heads-up display shown in FIG. 3A, where SLP 213 includes a variable optical attenuator 234 disposed in a path between the beam combiner 216 and the optical scanner 218. Processor 230 may provide a control signal to the variable optical attenuator 234 to attenuate the optical power of the beam 220a such that the current luminous flux projected into the eye matches the target luminous flux determined by processor 230. Thus, processor 230 may be able to choose between sending control signals to laser diode driver 215 to adjust the current luminous flux projected into the eye and sending control signals to the variable optical attenuator 234 to adjust the current luminous flux projected into the eye. An example of a variable optical attenuator that may be used is described in, for example, U.S. patent application Ser. No. 15/839,064 ("Systems, devices, and methods for variable illuminance in wearable heads-up display"), the disclosure of which is incorporated herein. The variable optical attenuator of U.S. patent application Ser. No. 15/839,064 is a liquid crystal element whose opacity can be modulated. However, any suitable variable optical attenuator may be used in the system of FIG. 4.

In one implementation, the variable optical attenuator 234 has characteristics to attenuate both the visible and infrared portions of beam 220a. In another implementation, the variable optical attenuator 234 is either positioned or has characteristics to attenuate only the visible portion of beam 220a and not the infrared portion of beam 220a. In yet another implementation, two variable optical attenuators may be used, where a first variable optical attenuator is responsive to visible light, i.e., attenuates visible light, and is unresponsive to infrared light, i.e., allows infrared light to pass through unchanged, and a second variable optical attenuator is responsive to infrared light, i.e., attenuates infrared light, and is unresponsive to visible light, i.e., allows visible light to pass through unchanged. If these two variable optical attenuators are arranged in series along the optical path between the beam combiner 216 and the optical scanner 218, the visible portion of beam 220a can be attenuated by the first variable optical attenuator, and the infrared portion of beam 220a can be attenuated by the second variable optical attenuator. Each of the variable optical attenuators may be controlled to achieve an overall desired current luminous flux into the eye.

Figure 5:
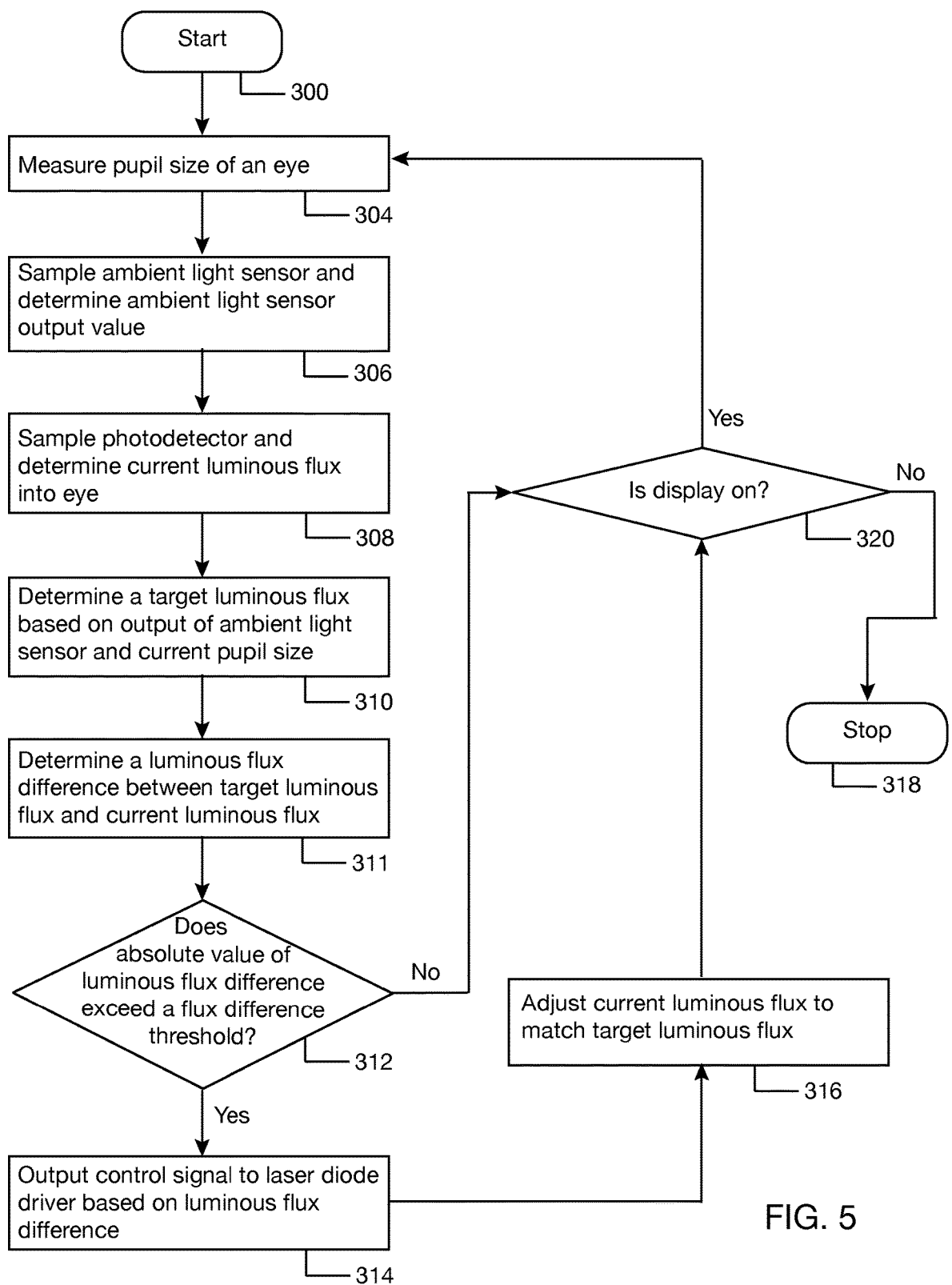
FIG. 5 is a flowchart illustrating a method of dynamically adjusting display luminance according to one implementation.

FIG. 5 illustrates a process of dynamically adjusting display luminance in response to ambient light conditions and pupil size. The process may be triggered whenever the display is turned on, i.e., when the SLP starts to project visible content into the display space. At the start 300 of the process, the subject user is wearing the wearable heads-up display, and the ambient light sensor is detecting ambient light conditions in at least a portion of the environment of wearable heads-up display. At 304, a pupil size of an eye of the user is measured. The measurement process may include generating an infrared light, scanning the infrared light over the eye of the user, and detecting reflections of infrared light from the eye. In one example, the measurement process may further include the processor reconstructing (or constructing) an image or digital representation of the eye from the detected reflections and scan orientation data, isolating a pupil region of the image or digital representation, and determining the pupil size from the pupil region. In another example, the measurement process may further include detecting a pupil edge from an output of the infrared detector and from sync mirror signals generated by the scan mirror driver and determining the pupil size from the pupil edge information, where an edge detection circuit may determine the pupil size and provide the pupil size to the processor or the processor may receive pupil edge information from the edge detection circuit and determine the pupil size from the pupil edge information. The pupil size may, for example, be represented as any one or more of: a diameter of the pupil, a radius of the pupil, a circumference of the pupil, or an area of the pupil.

At 306, the processor samples an output of the ambient light sensor and determines an ambient light sensor output value, $K_w$, from the sampled output of the ambient light sensor. At 308, the processor samples an output of the photodetector and determines the current luminous flux into the eye from the sampled output of the photodetector. At 310, the processor determines a target luminous flux. In one example, the ambient light sensor output value obtained from the output of the ambient light sensor at 306 is used to determine (e.g., compute, lookup) target luminance (see, e.g., Equation (1)). The target luminance obtained at 308 and the pupil size measured at 304 are then used to determine the target luminous flux (see, e.g., Equations (2) and (3)). At 311, the processor determines (e.g., compute, lookup) a difference between the target luminance flux obtained at 310 and the current luminous flux obtained at 308. At 312, the processor determines if the absolute value of the difference between the target luminous flux and current luminous flux exceeds a flux difference threshold. The flux difference threshold indicates when the difference between the target luminous flux and current luminous flux is significant enough that the current luminous flux should be adjusted. This avoids a situation where the luminous flux is adjusted too frequently that the display starts to flicker. In one non-limiting example, the flux difference threshold may be 5% of the current luminous flux.

If the absolute value of the difference between the target luminous flux and current luminous flux exceeds the flux difference threshold, the processor outputs a control signal to the laser diode driver at 314. The control signal includes an indication of the amount by which the current luminous flux should be increased or decreased to match the target luminous flux. In response, as shown at 316, the laser diode driver adjusts the drive current to one or more of the laser diodes to match the target luminous flux. Adjusting the current luminous flux to match the target luminous flux will result in automatic adjustment of the display luminance to match the target luminance. As an alternative, the processor may output a control signal to the variable optical attenuator (s) at 314. The control signal may include an indication of an amount by which the current luminous flux should be attenuated to match the target luminous flux. In this case, adjusting the current luminous flux at 316 to match the target luminous flux will be performed by the variable optical attenuator(s). If at 312 the absolute value of the difference between the target luminous flux and the current luminous flux does not exceed the flux difference threshold, control may pass to 320. Similarly, after adjusting the current luminous flux to match the target luminous flux, control may pass to 320. At 320, the processor determines if the display is still on. If the display is still on, acts 304 through 316 may be repeated. If the display is no longer on, the process terminates, as shown at 318.

Figure 6:
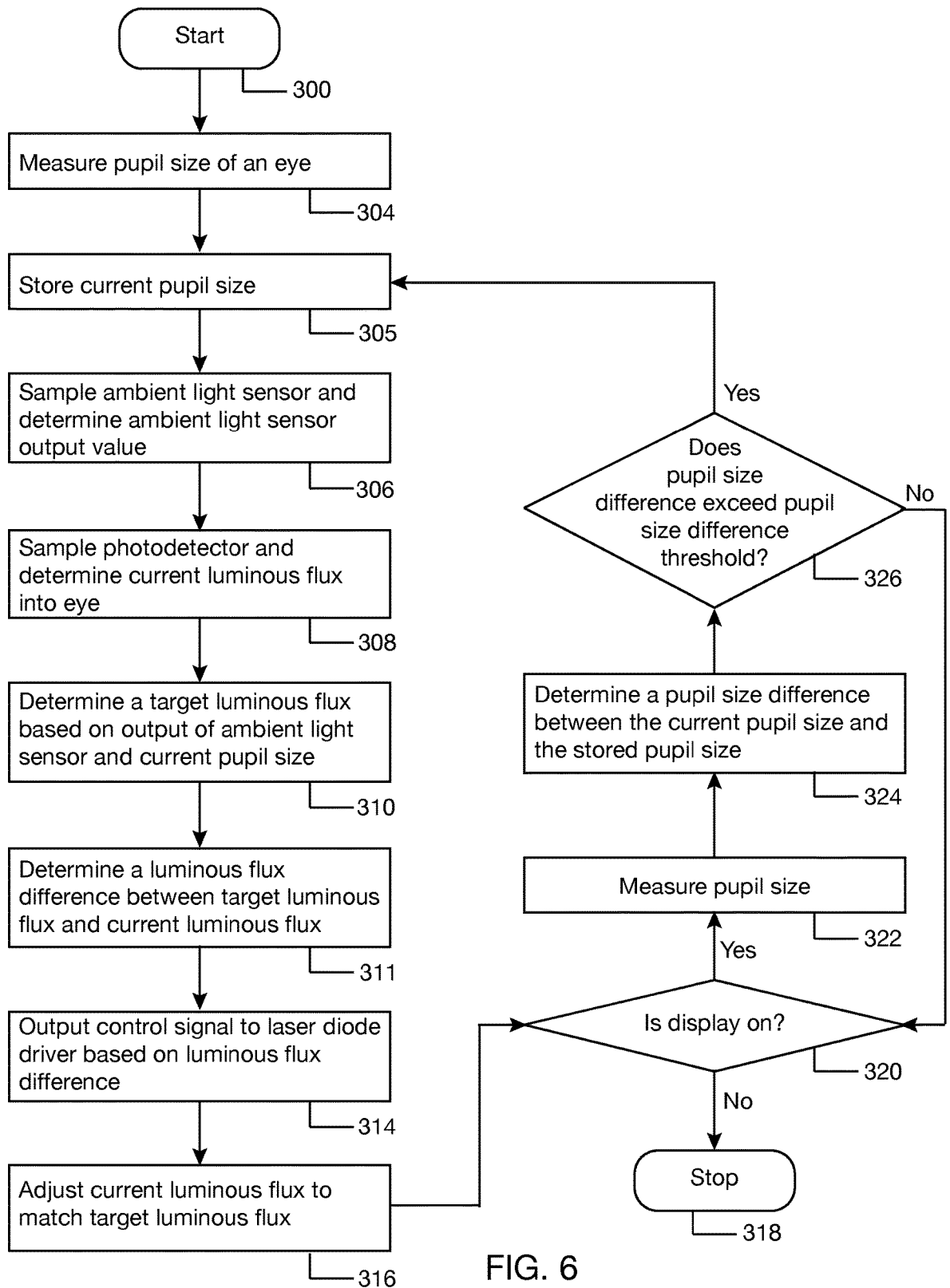
FIG. 6 is a flowchart illustrating a method of dynamically adjusting display luminance according to another implementation.

FIG. 6 shows a variation to the process described in FIG. 5, where the decision to adjust current luminous flux is based on whether the change in pupil size is significant enough. Acts 300, 304, 306, 308, 310, 311, 314, and 316 are common to FIGS. 5 and 6. In FIG. 6, at 305, the current pupil size, which in the first run of the process is the pupil size measured at 304, is stored. After adjusting the current luminous flux at 316, the process continues at 320, where the processor determines if the display is still on. If the display is still on, the pupil size is measured at 322. At 324, the processor determines a difference between the current pupil size measured at 322 and the previous pupil size stored at 305. At 326, the processor determines if an absolute value of the difference between the current pupil size and the previous pupil size exceeds a pupil size difference threshold. If the pupil size difference exceeds the pupil size difference threshold, acts 305 through 316 may be repeated, i.e., the display luminance is adjusted. The pupil size difference threshold indicates when the change in pupil size is significant enough to adjust the luminous flux into the eye. In one non-limiting example, the pupil size difference threshold may be 5% of the previous pupil size. If the pupil size difference does not exceed the pupil size difference threshold, the process may return to 320. Optionally, the process may wait for a short period before returning to 320.

Figure 7:
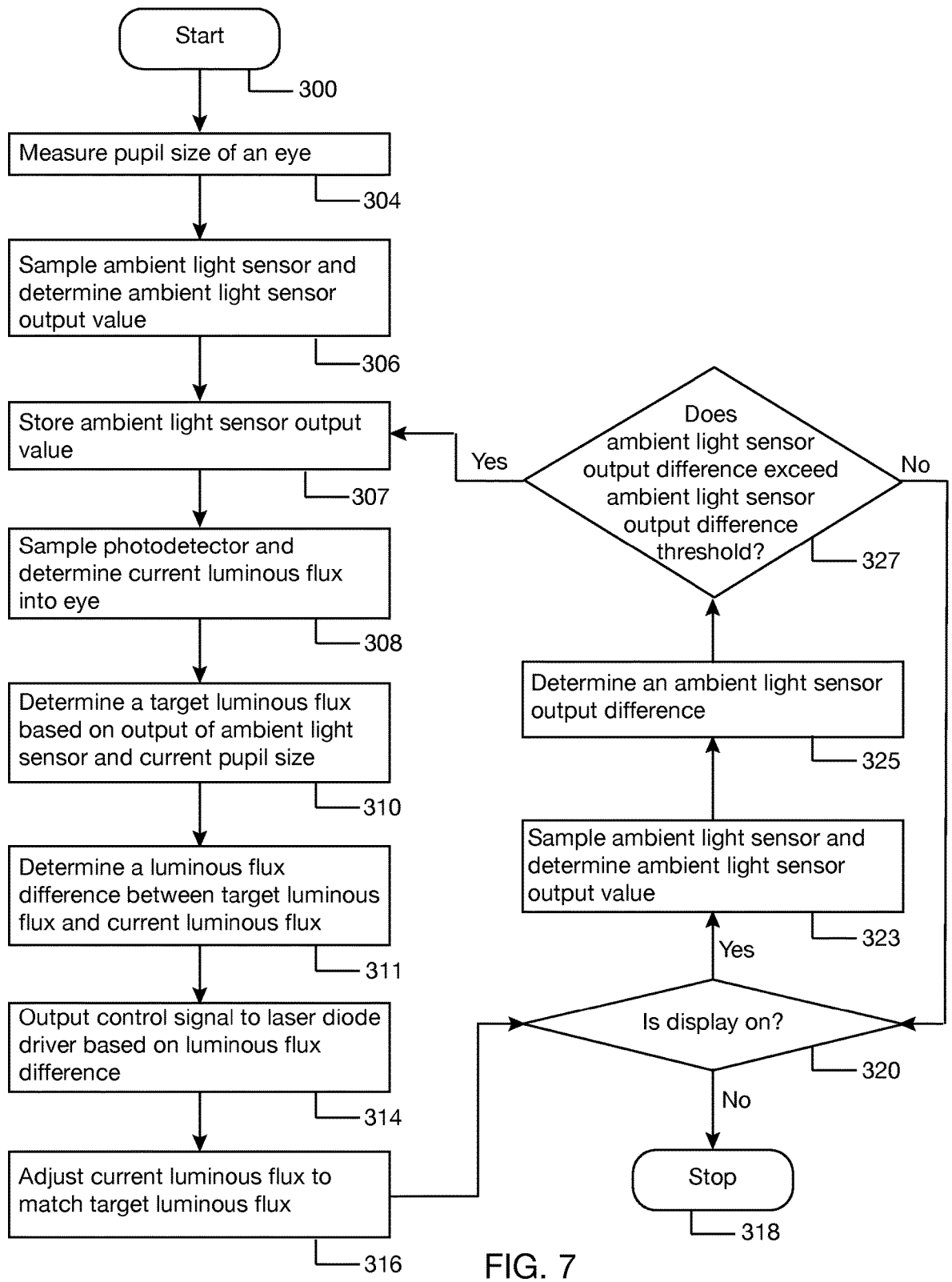
FIG. 7 is a flowchart illustrating a method of dynamically adjusting display luminance according to another implementation.

FIG. 7 shows a variation to the process described in FIG. 5, where the decision to adjust current luminous flux is based on whether the change in ambient light sensor output value is significant enough. Acts 300, 304, 306, 308, 310, 311, 314, and 316 are common to FIGS. 5 and 7. In FIG. 7, at 307, the current ambient light sensor output value is stored. In the first run of the process, the current ambient light sensor output value is the ambient light sensor output value determined at 306 from the pupil size measured at 304. After adjusting the current luminous flux at 316, the process continues at 320, where the processor determines if the display is still on. If the display is still on, at 323, the ambient light sensor is sampled, and an ambient light sensor output value is determined from the sample. At 325, the processor determines a difference between the current ambient light sensor output value determined at 323 and the previous ambient light sensor light output value stored at 307. At 327, the processor determines if an absolute value of the ambient light sensor output value difference exceeds an ambient light sensor output difference threshold. If the ambient light sensor output difference exceeds an ambient light sensor output difference threshold, acts 307 through 316 may be repeated, i.e., the display luminance is adjusted. The ambient light sensor output difference threshold indicates when the change in ambient light sensor output value is significant enough to adjust the luminous flux into the eye. In one non-limiting example, the ambient light sensor output difference threshold may be 10% of the previous ambient light sensor output value. If the ambient light sensor output difference does not exceed the ambient light sensor output difference threshold, the process may return to 320. Optionally, the process may wait for a short period before returning to 320.

Figure 8:
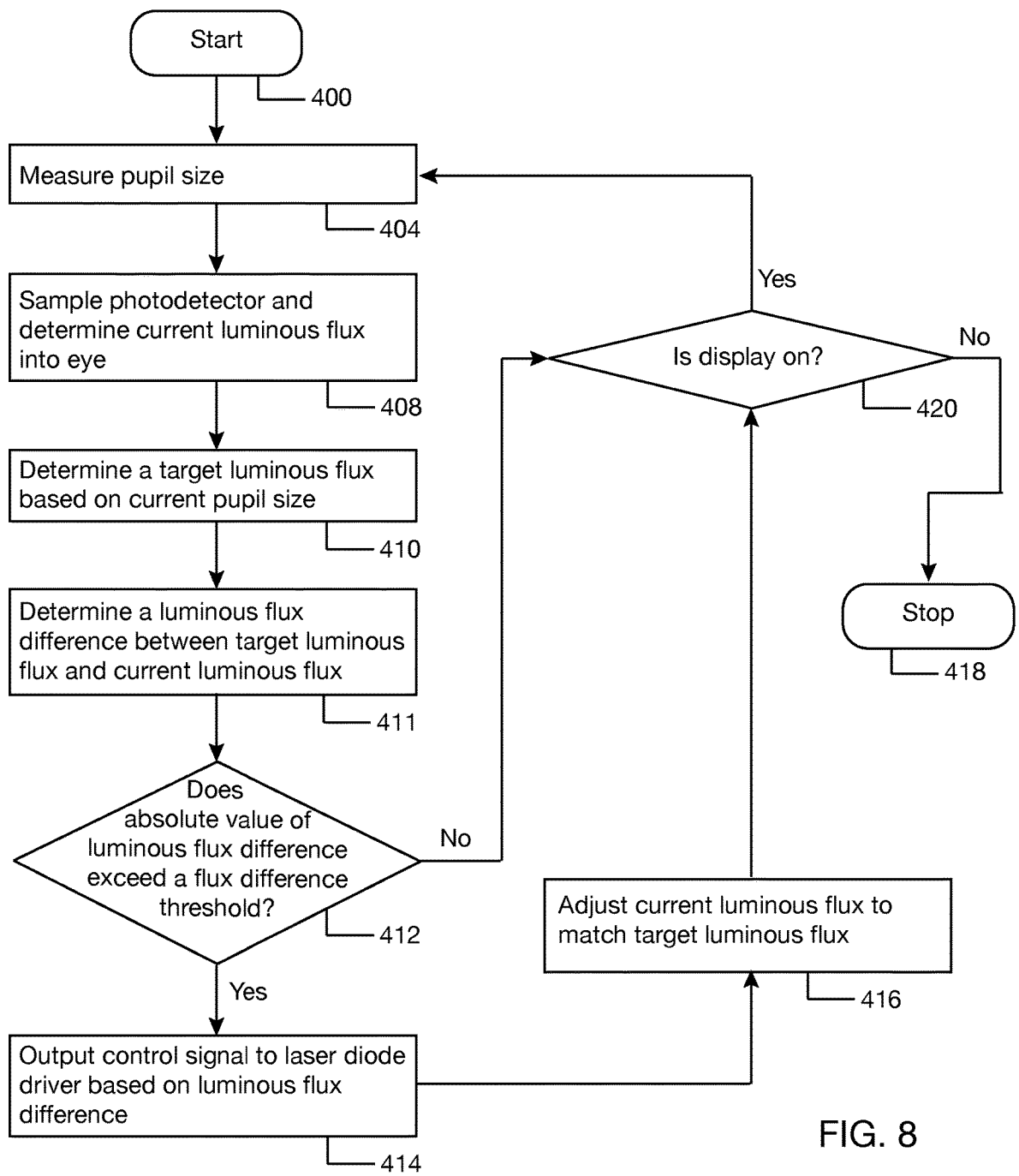
FIG. 8 is a flowchart illustrating a method of dynamically adjusting display luminance based on changes in pupil size.

In a wearable heads-up display using a free-space combiner, such as holographic-based combiner 224 (in FIG. 3B), the pupil size restricts the amount of light from the world, but not from the display. In a wearable heads up display using a substrate-guided combiner, such as lightguide-based combiner 224' (in FIG. 3C), the pupil size restricts the amount of light from both the world and the display. In this latter case, the pupil size could provide some indication about the brightness of the total scene (world and display). However, the equations outlined above, i.e., Equations (2) to (4), may not be useful in determining target luminous flux. Instead, the pupil size measurement may be used simply as a proxy for the ambient light sensor, i.e., $L_{target}$ may be calculated according to Equation (1) or variants thereof, with $K_w$ determined from the pupil size. FIG. 8 shows a process for dynamically adjusting display luminance in response to pupil size. The process starts at 400 with the subject user wearing the wearable heads-up display. Act 404 is the same as act 304 of FIG. 5, i.e., measuring pupil size. Act 408 is the same as act 308 of FIG. 5, i.e., sampling the photodetector to determine the current luminous flux into the eye. At 410, a target luminous flux is determined based on the current pupil size. Act 411 is similar to act 311 of FIG. 5, i.e., determining a luminous flux difference between the target luminous flux and the current luminous flux. Acts 412, 414, 416, 418, 420 are the same as acts 312, 314, 316, 318, and 420, respectively, in FIG. 5. The process described in FIG. 8 may take advantage of the decision to adjust current luminous flux based on whether the change in pupil size is significant enough as described in FIG. 6.

The foregoing detailed description has set forth various implementations or embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation or embodiment, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" or "non-transitory computer-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the implementations or embodiments to the precise forms disclosed. Although specific implementations or embodiments and examples are described herein for illustrative purposes, various equivalent modifications can be made without departing from the spirit and scope of the disclosure, as will be recognized by those skilled in the relevant art. The teachings provided herein of the various implementations or embodiments can be applied to other portable and/or wearable electronic devices, not necessarily the exemplary wearable electronic devices generally described above.

The invention claimed is:

1. A method of operating a wearable heads-up display that in use is worn on a head of a subject user, the method comprising:
   projecting light to an eye of the subject user;
   detecting an ambient light condition in at least a portion of an environment of the wearable heads-up display by an ambient light sensor;
   determining a pupil size of the eye of the subject user;
   determining a target luminous flux of the light projected to the eye of the subject user based on the ambient light condition detected by the ambient light sensor and the determined pupil size; and
   adjusting a current luminous flux of the light projected to the eye of the subject user based on the determined target luminous flux.

2. The method of claim 1, wherein projecting light to an eye of the subject user comprises generating a visible portion of the light by at least one visible light source and scanning the visible portion of the light over at least a portion of the eye by at least one scan mirror.

3. The method of claim 1, wherein projecting light to an eye of the subject user comprises generating an infrared portion of the light by at least one infrared light source and scanning the infrared portion of the light over at least a portion of the eye by at least one scan mirror.

4. The method of claim 3, wherein determining a pupil size of the eye of the subject user comprises detecting reflections of infrared light from the at least a portion of the eye for a plurality of scan orientations of the at least one scan mirror.

5. The method of claim 4, wherein determining a pupil size of the eye of the subject user further comprises determining the pupil size from the detected reflections of infrared light and corresponding scan orientations of the at least one scan mirror.

6. The method of claim 5, wherein determining a pupil size of the eye of the subject user further comprises constructing or reconstructing a digital representation of the at least a portion of the eye from the detected reflections of infrared light and corresponding scan orientations of the at least one scan mirror.

7. The method of claim 6, wherein determining a pupil size of the eye of the subject user further comprises isolating a pupil region of the digital representation and determining the pupil size from the pupil region.

8. The method of claim 7, wherein determining the pupil size from the pupil region comprises at least one of determining a diameter of the pupil region and determining an area of the pupil region.

9. The method of claim 1, wherein determining a target luminous flux based on an output of the at least one ambient light sensor and the determined pupil size comprises selecting a target display luminance from a select range of display luminance based on the output of the ambient light sensor.

10. The method of claim 9, wherein determining a target luminous flux based on an output of the at least one ambient light sensor and the determined pupil size further comprises determining the target luminous flux based on the target display luminance and the pupil size.

11. The method of claim 1, wherein adjusting a current luminous flux of the light projected into the eye of the subject user based on the target luminous flux comprises adjusting the current luminous flux to match the target luminous flux.

12. The method of claim 1, wherein projecting light to an eye of the subject user comprises generating the light by at least one light source and scanning the light over at least a portion of the eye by at least one scan mirror, and wherein adjusting a current luminous flux of the light projected to the eye of the subject user based on the target luminous flux comprises measuring the current luminous flux of the light projected to the eye of the subject user.

13. The method of claim 12, wherein measuring the current luminous flux of the light projected to the eye of the subject user comprises directing at least a portion of the light projected to the eye of the subject user towards a photodetector and determining a value of the current luminous flux from an output of the photodetector.

14. The method of claim 13, wherein adjusting a current luminous flux of the light projected to the eye of the subject user based on the target luminous flux further comprises modulating a drive current to the at least one light source based on a difference between the measured current luminous flux and the target luminous flux.

15. The method of claim 13, wherein adjusting a current luminous flux of the light projected to the eye of the subject user based on the target luminous flux comprises directing at least a portion of the light towards a variable optical attenuator and controlling the variable optical attenuator to attenuate the at least a portion of the light based on a difference between the measured current luminous flux and the target luminous flux.

16. A wearable heads-up display having a field of view, comprising:
  a support frame that in use is worn on a head of a subject user;
  a scanning light projector carried by the support frame, the scanning light projector to project light to an eye of the subject user, the scanning light projector comprising at least one light source to generate the light and at least one scan mirror to scan the light over the eye of the subject user;
  an ambient light sensor carried by the support frame, the ambient light sensor positioned and oriented to detect an ambient light condition in at least a portion of an environment of the wearable heads-up display;
  a processor carried by the support frame; and
  a non-transitory processor-readable storage medium communicatively coupled to the processor, wherein the non-transitory processor-readable storage medium stores data and/or processor-executable instructions, that when executed by the processor, causes the wearable heads-up display to:
    determine an ambient light sensor output value representing the ambient light condition detected by the ambient light sensor from an output of the ambient light sensor;
    determine a pupil size of the eye of the subject user;
    determine a target luminous flux of the light projected to the eye of the subject user based on the ambient light sensor output value and the pupil size; and
    adjust a current luminous flux of the light projected to the eye of the subject user based on the target luminous flux.

17. The wearable heads-up display of claim 16, further comprising an infrared detector carried by the support frame, the infrared detector positioned and oriented to detect reflections of infrared light from the eye of the subject user.

18. The wearable heads-up display of claim 16, further comprising a transparent combiner carried by the support frame, the transparent combiner positioned within the field of view of the wearable heads-up display, the transparent combiner including at least one of a holographic optical element and a lightguide, the transparent combiner aligned to receive the light from the at least one scan mirror and redirect the light towards the eye of the subject user when the support frame is worn on the head of the subject user.

19. The wearable heads-up display of claim 16, wherein the scanning light projector further comprises a variable optical attenuator to selectively attenuate the light projected to the eye of the subject user in response to a control signal to adjust the current luminous flux to match the target luminous flux.

20. A method of operating a wearable heads-up display that in use is worn on a head of a subject user, the method comprising:
  projecting light to an eye of the subject user;
  determining a pupil size of the eye of the subject user;
  determining an ambient light level based on the pupil size;
  determining a target luminous flux of the light projected to the eye of the subject user based on the determined pupil size and the ambient light level; and
  adjusting a current luminous flux of the light projected to the eye of the subject user based on the determined target luminous flux.

* * * * *

UNITED STATES PATENT AND TRADEMARK OFFICE
CERTIFICATE OF CORRECTION

PATENT NO. : 10,983,349 B2
APPLICATION NO. : 16/412542
DATED : April 20, 2021
INVENTOR(S) : Matthew Oliver and Bergen Fletcher It is certified that error appears in the above-identified patent and that said Letters Patent is hereby corrected as shown below:

In the Claims

Column 16 Line 43, Claim 9 delete "at least one" after the and before ambient

Column 16 Line 48, Claim 10 delete "at least one" after the and before ambient

Signed and Sealed this
Seventh Day of March, 2023

Katherine Kelly Vidal
*Director of the United States Patent and Trademark Office*